United States Patent [19]

Antik

[11] Patent Number: 5,293,994

[45] Date of Patent: Mar. 15, 1994

[54] VIDEO CASSETTE PACKAGE

[75] Inventor: Alan L. Antik, Baltimore, Md.

[73] Assignee: Producers Color Service, Inc., Southfield, Mich.

[21] Appl. No.: 51,009

[22] Filed: Apr. 21, 1993

Related U.S. Application Data

[63] Continuation of Ser. No. 679,211, Apr. 2, 1991, abandoned.

[51] Int. Cl.⁵ .......................................... B65D 85/672
[52] U.S. Cl. .................................. 206/387; 206/232; 229/92.8; 229/242
[58] Field of Search ............... 206/387, 491, 492, 424, 206/45.28, 45.29, 45.31, 232; 229/92.8, 240, 242, 921

[56] References Cited

U.S. PATENT DOCUMENTS

| | | | |
|---|---|---|---|
| 471,846 | 3/1892 | Mackinney | 229/921 |
| 1,060,431 | 4/1913 | Dague | 229/921 |
| 1,767,734 | 6/1930 | Brown | 229/921 |
| 1,943,074 | 1/1934 | Heyman | 229/921 |
| 2,359,679 | 10/1944 | Roehrl | 229/92 |
| 2,646,876 | 7/1953 | Sparks | 229/92.8 |
| 3,217,868 | 11/1965 | Champlin et al. | 206/424 |
| 3,219,253 | 11/1965 | Davis | 206/45.28 |
| 3,253,770 | 5/1966 | Black | 206/424 |
| 3,469,765 | 9/1969 | Mueller | 206/45.29 |
| 3,508,702 | 4/1970 | Kaiser | 229/92.8 |
| 4,307,806 | 12/1981 | Haubert | 206/387 |
| 4,417,655 | 11/1983 | Forbes, Jr. | 206/45.28 |
| 4,433,780 | 2/1984 | Ellis | 206/387 |
| 4,765,466 | 8/1988 | Ivey | 206/387 |
| 4,867,372 | 9/1989 | Patterson | 229/921 |
| 4,955,469 | 9/1990 | Hudspith | 206/45.23 |
| 4,978,009 | 12/1990 | Pany | 206/387 |
| 5,038,930 | 8/1991 | Holtkamp, Jr. | 206/232 |
| 5,078,268 | 1/1992 | Olson et al. | 206/387 |
| 5,096,058 | 3/1992 | Juravin et al. | 206/232 |
| 5,232,087 | 8/1993 | Schluger | 206/232 |

FOREIGN PATENT DOCUMENTS

2558579 7/1977 Fed. Rep. of Germany ...... 206/387

*Primary Examiner*—David T. Fidei
*Attorney, Agent, or Firm*—Barnes, Kisselle, Raisch, Choate, Whittemore & Hulbert

[57] ABSTRACT

A wrap around package for a video cassette or the like having a box-like portion to contain the video cassette and a covering flap to wrap around the box-like portion. At least one wall of the box-like portion has perforated edges thereon and an opening or tab to grasp the one wall to facilitate opening of the one wall while maintaining the integrity of the box-like portion to permit automatic and easy insertion of the cassette therein. Access to the one wall, and the contents of the package, is prevented until the covering flap is unfolded from over the one wall. Space is provided on the surfaces of the covering flap and on the walls of the box-like portion for printing of advertising thereon. The package requires unwrapping of the covering flap to remove the contents of the package. Preferably, the package is formed from a single piece of material. An individualized addressed written message may be inserted in the package in a collapsed position. A window is provided in the covering flap to expose the address on the message. A simple inexpensive package is provided for using video cassettes in the direct mail media.

22 Claims, 5 Drawing Sheets

VIDEO CASSETTE PACKAGE

This is a continuation of copending application Ser. No. 07/679,211 filed on Apr. 2, 1991, now abandoned.

The present invention relates to packaging and more particularly, to a wrap around package for containing video cassettes and the like wherein the package may be used for general promotion purposes.

BACKGROUND OF THE INVENTION

Video cassettes and similar types of audio and video tapes are usually packaged in a paperboard sleeve which is open at one end. The cassette is slid into the sleeve to provide a degree of protection during handling. The sleeve also serves to identify the contents of the cassette listing the performing artists (if any) and other information.

More recently, video cassettes have been considered as a powerful medium for direct mail advertising as well as other promotional programs. In this role, the package for the cassette must provide adequate protection during shipping and particularly for mass mailings through the U.S. Postal System. Further, it is most desirable for the package to provide sufficient space for a printed advertising message as well as what is deliverable on the cassette. The printed advertising message greatly enhances the overall communication and persuasion capabilities of the unit. Also, a cover must be included in the package to insure that the recipient is exposed to the advertising on the package before having access to the cassette. Since the recipient of these units are usually not charged any fees, a low unit cost is a key factor in the expansion of direct mail video as a marketing tool. In addition to direct mail advertising, video cassettes may be used for catalog information, directions, promotions, video magazines, greeting cards and other commercial ventures. Such packaging could also be useful in marketing of the cassette as a letter on which a consumer could tape an individual, personal message and could mail to family, friends and others.

The currently available sleeve-type pack is not very satisfactory for mailing and provides only limited space on the two broad panels for advertising. On the infrequent occasions when this sleeve is used for mailings it is shrink wrapped. However, for most mailings the sleeve is further protected by an overpack such as a carton, bubble bag or jiffy bag. Since these outer wraps are not very suitable for advertising, additional advertising literature is often inserted into the pack. The additional costs of the overwrap, advertising literature and manual labor to provide a reliable mailing unit and a more persuasive advertising vehicle greatly diminishes the marketers' ability to use this vehicle broadly and in large quantities.

Accordingly, for video cassette promotional programs and direct mail efforts in particular, there remains a need to provide a package that gives proper protection to the cassette, expands the print space and the general capability to deliver effective advertising, while lowering the unit cost by eliminating additional materials and manual labor.

SUMMARY OF THE INVENTION

A principal object of the present invention is to provide a single package for a video cassette and the like which protects the cassette during handling and mailing.

It is another object of the present invention to provide a single package for a video cassette and the like which includes sufficient space to print an advertising message.

It is a further object of the present invention to provide a package for a video cassette and the like which permits access to the cassette only after the viewer has had an opportunity to view the advertising on the package.

It is yet another object of the invention to integrate a die cut response card capability into the package and also provide an inserted personalized letter.

It is still another object of the present invention to create a more effective direct mail video advertising vehicle by merging the capabilities of print advertising, video advertising response card pull through and personalized letter, into one mailer unit.

It is a primary object of the present invention to lower costs by accomplishing all the objectives stated with one inexpensive package, easy to fabricate, that can be utilized on currently available automatic cassette sleeve loading equipment, thereby eliminating additional components and manual labor.

In accordance with the teachings of the present invention there is disclosed a wrap around package for containing a video cassette or the like, the package having a width, and comprising a box-like portion having four walls and two ends. The walls and the ends are closable to retain the contents therein. One wall has accommodations thereon for rapid and simple opening of said wall to provide access to the contents of the package while maintaining the structural integrity of the box-like portion to permit automatic and easy insertion of the cassette therein. A covering flap is connected to the package. The covering flap has folds therein, such that the covering flap may be wrapped about and conform to the box-like portion to cover the box-like portion. The covering flap provides protection to the box-like portion and the contents thereof during handling of the package. The covering flap provides space thereon for printing of advertising, promotional messages, directions and the like. The package requires unwrapping of the covering flap to remove the contents of the package. The accommodations for rapid and simple opening of the one wall comprises the one wall having a pair of edges extending the width of the package, the edges meeting the respective adjoining sides. At least one edge has a plurality of spaced-apart perforations therein. Finger engaging portions are provided for grasping the one wall wherein the one wall may be pulled to easily rupture the one wall to provide access to the contents of the package.

These and other objects of the present invention will become apparent from a reading of the following specification, taken in conjunction with the enclosed drawings.

DESCRIPTION OF THE PREFERRED EMBODIMENTS

Figure 1:
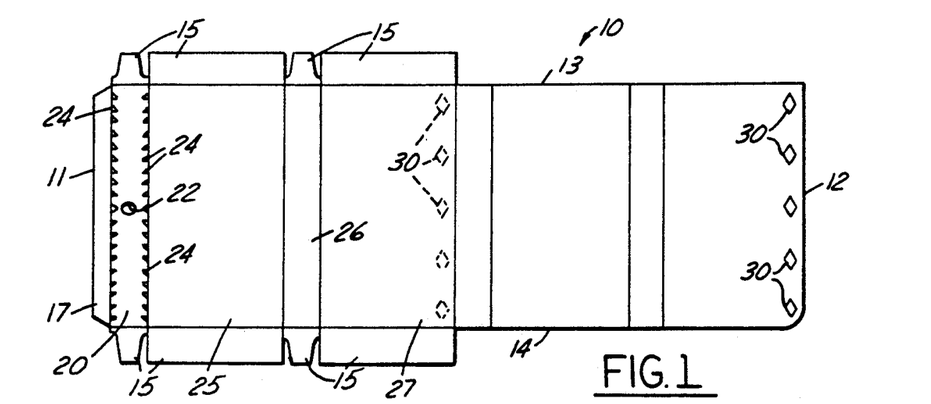
FIG. 1 is a laid out view of the package of the present invention showing the single piece construction.
Figure 2:
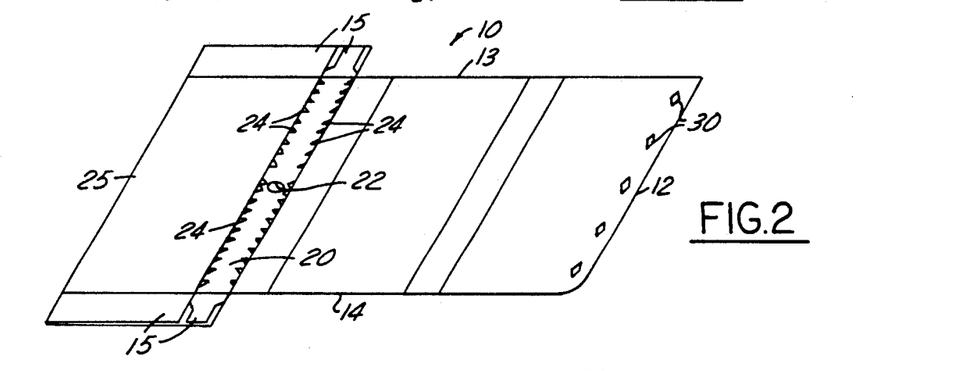
FIG. 2 is a perspective view of the package of the present invention showing the package in a collapsed position.

Referring now to the drawings, the package is preferably formed from a single sheet of material (FIG. 1) for cost efficiency, ease of manufacture and assembly. The material may be paperboard, plastic or any other material which is inexpensive, easily folded, provides protection for the contents of the package and on which printing, graphics and instructions may be affixed. The material preferably is die-cut into a form which has a first end 11, a second end 12, a first side 13 and a second side 14. The sides 13, 14 are substantially perpendicular to the respective ends. Extending outwardly from the sides 13, 14 near the first end 11 of the sheet of material are a plurality of tabs 15 which, when the sheet is folded, serve as the ends of a box-like portion 16. The tabs 15 may be folded to overlap on the respective ends to retain contents within the box or sleeve-like compartment 16. The first end 11 of the sheet of material has an end strip 17 thereon. The sheet of material is foldable so that the end strip 17 is adjoining the sheet of material near the center thereof and is fastened to the sheet of material to form the box-like portion 16. The box-like portion 16 is in a collapsed form (FIG. 2). The box-like portion 16 must have four walls to provide structural integrity in order for a standard assembly machine to shape an open box from the collapsed form as will be described.

Figures 3, 3A, 4:
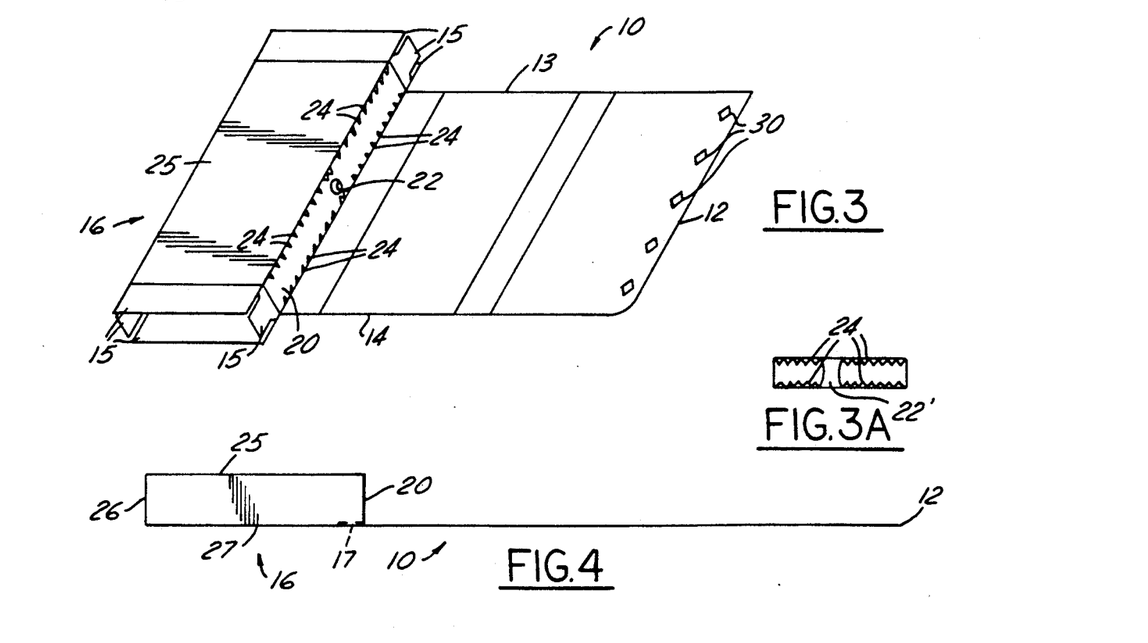
FIG. 3 is a perspective view of the package of the present invention showing the protective cover unfolded and the box-like portion having open ends.
FIG. 3A shows an alternate embodiment of the means for opening the side wall of the box-like portion.
FIG. 4 is a side view of the package of FIG. 3.
Figures 5, 6, 7, 8, 9:
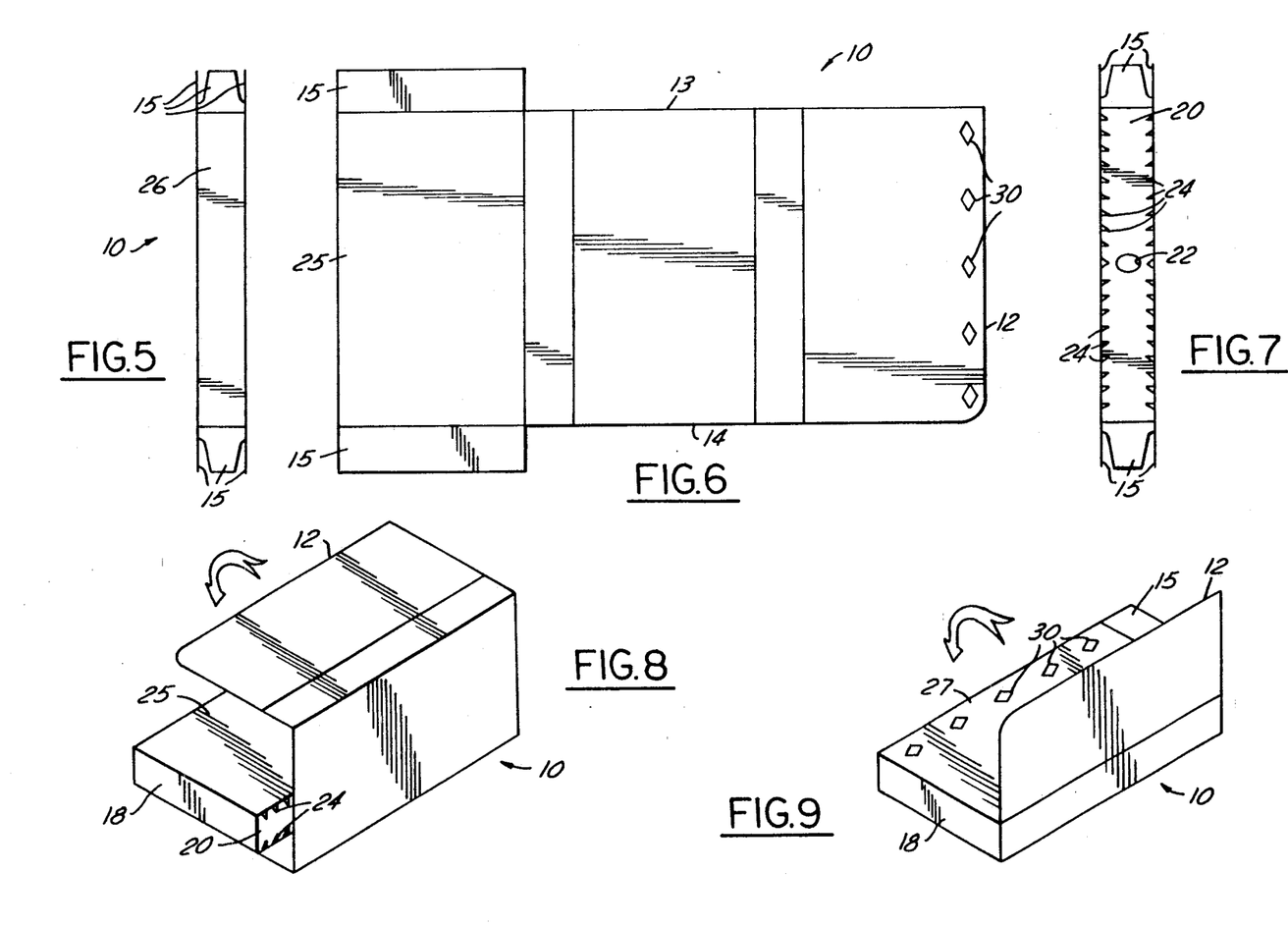
FIG. 5 is a left end view of the package of FIG. 3.
FIG. 6 is a top plan view of the package of FIG. 3.
FIG. 7 is a right end view of the package of FIG. 3.
FIG. 8 is a perspective view showing the initial folding of the covering flap.
FIG. 9 is a perspective view showing the final folding of the covering flap.
Figures 15, 16, 17, 18:
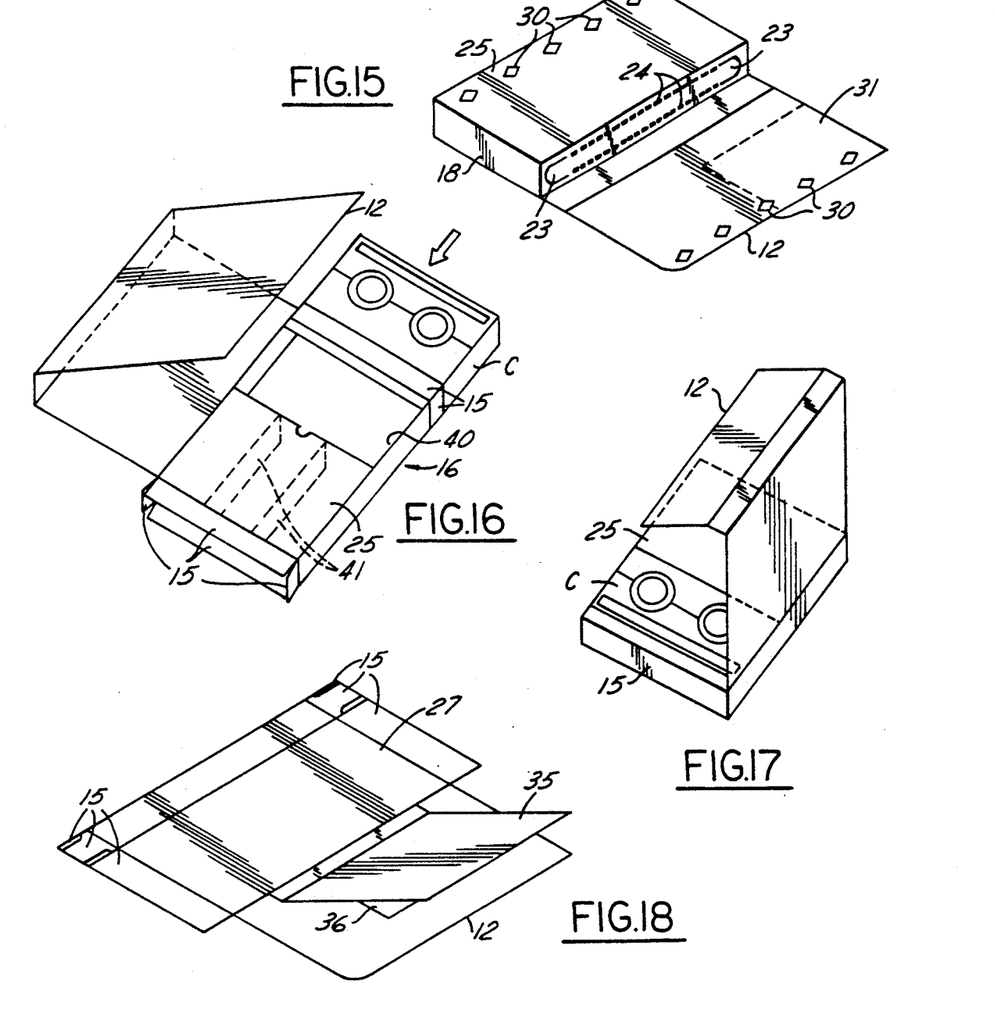
FIG. 15 is a perspective view of an alternate embodiment of the means for opening the side wall of the box-like portion.
FIG. 16 is a perspective view of the package of the present invention showing the cassette removable from an opening within the sleeve-like compartment.
FIG. 17 is a perspective view of the package of FIG. 16 showing the folding of the covering flap.
FIG. 18 is a perspective view showing a written message being introduced into the package in a collapsed position.
Figure 19:
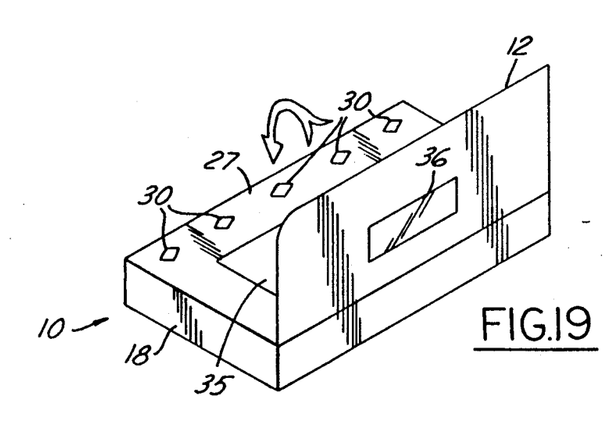
FIG. 19 is a perspective view showing folding of the package having the written message therein.
Figure 20:
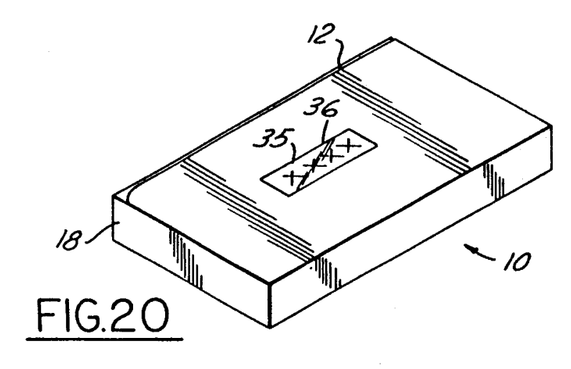
FIG. 20 is a perspective view showing closure of the package having the written message therein.
Figure 21:
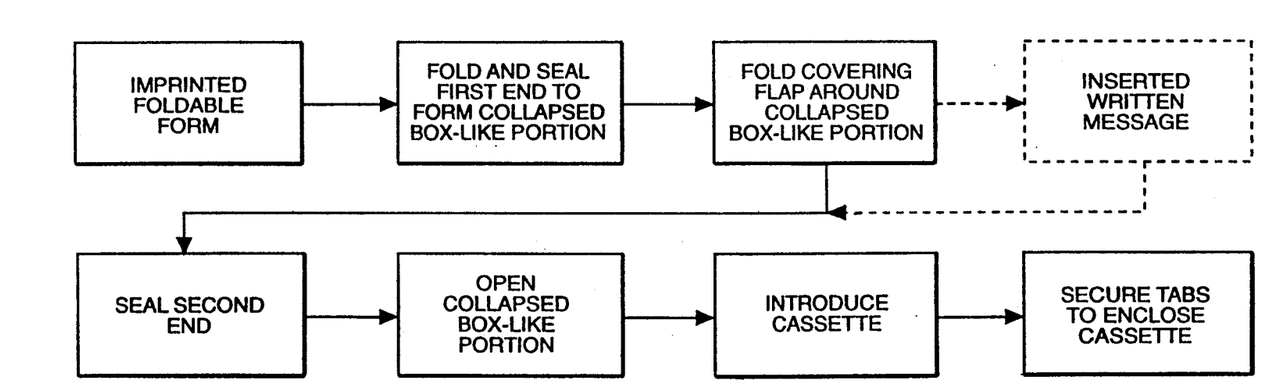
FIG. 21 is a block diagram showing the method of forming the package.

When the end strip 17 is fastened to the sheet of material, the panel 20, adjacent to the end strip 17, now forms one wall of the box-like portion 16 and is adjacent to approximately the center of the sheet of material. The box-like portion 16 has four walls 20, 25, 26, 27, all formed from the sheet of material when the sheet is folded (FIGS. 4–7). The panel 20 has a pair of edges 21 which extend the width of the package 10 from the first side 13 to the second side 14. At least one edge, and preferably both edges, have a plurality of spaced-apart perforations 24 therein. A finger engaging portion for grasping the panel 20 is provided for opening or removing the one wall as will be described. The means for grasping the panel 20 may be an opening 22, 22' into which a finger may be inserted or a projection 23 which may be held between the fingers (FIGS. 3, 3A and 15). The perforations may be of any desired configuration known to persons skilled in the art. Also, accommodations other than perforations, such as a tear wire or string may be incorporated into the package to facilitate opening of the one wall 20. The package further may be formed such that an opening 40 is provided in a wall 25 of the box-like portion (sleeve-like compartment) 16 to provide access to the cassette (FIGS. 16 and 17). Preferably, foldable support members 41 are disposed in the sleeve-like compartment 16 to provide additional structural support when the sleeve-like compartment 16 is in its opened position.

To complete the package, the second end 12 of the package 10 is provided with fold lines wherein the sheet of material may be completely folded around the box-like portion 16 (FIGS. 8, 9 and 17) as a covering flap. This covering flap provides protection for the contents during handling. To further assist in closing the package 10, an adhesive is provided to fasten the second end 12 of the sheet of material to the body of the package. Fastening by any method may be used, however, a preferred method is by the use of an adhesive or glue. Preferably, a plurality of locations 30 are provided near the second end 12 of the sheet of material and on the body of the package where the adhesive is disposed to assure secure fastening but also to permit ease of opening of the package. In the preferred embodiment, similar geometrically configured areas are identified on the surfaces to be joined and the adhesive is disposed on one or both of the surfaces prior to placing the surfaces in contact with one another.

Figures 10, 11, 12:
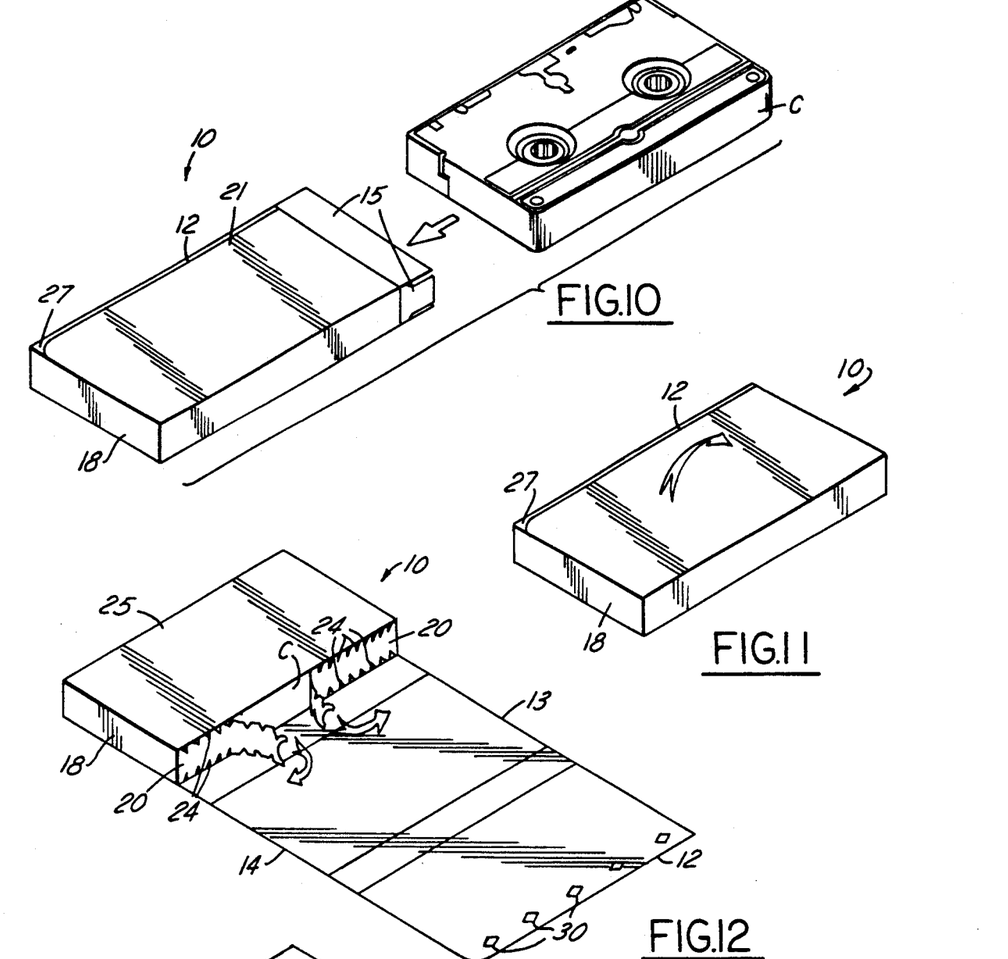
FIG. 10 is a perspective view showing the cassette being introduced into the package.
FIG. 11 is a perspective view showing the initial unfolding of the covering flap.
FIG. 12 is a perspective view showing the covering flap unfolded and the one wall partially opened.

The package 10 may be used with a standard assembly machine. This equipment, common to the packaging industry may be cartoning machinery which forms and loads cassettes into sleeves. The machinery is both automatic and semi-automatic and includes features of continuous carton-blank feeding, carton forming, glue sealing and carton closing. Cartons of different sizes are accommodated by the standard machinery. The machinery provides a method to press against a collapsed form of the box-like portion to form an open container. The openable wall (panel) 20 is necessary for structural integrity to the box-like portion 16. Omission of wall 20 would preclude use of the automatic forming and loading machinery and would necessitate costly and time consuming manual operations. The item (cassette) to be contained in the box-like portion 16 is, preferably, introduced by the machine but the operation may be performed manually (FIG. 10). The tabs 15 on one end 18 of the box-like portion 16 are preferably closed and sealed prior to introduction of the cassette C into the box-like portion 16. Following introduction of the cassette C, the tabs 15 the other end of the box-like portion are sealed to fully retain the cassette C. The closing and sealing of the tabs 15 can be performed by currently available equipment or can be performed manually. The design of the present invention, which utilizes available automatic packaging equipment for assembly, is an important factor in reducing the production costs and permitting broader use of the cassette for promotional purposes.

Figure 13:
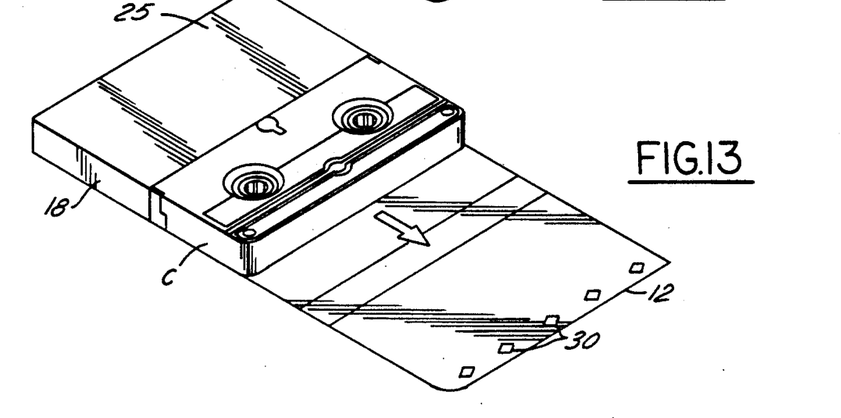
FIG. 13 is a perspective view showing the cassette being removed through the one wall of the package.

In order to open the package 10 to access the contents of the box-like portion 16, the second end 12 is grasped and lifted from the body of the package (FIG. 11). The adhesive is overcome and the covering flap is unfolded from the box-like portion 16. When so opened, the advertising, promotional message, printed matter, graphics or other information on the both the outer surface and the inner surface of the covering flap is directly in the view of the person opening the package similar to the opening of a book cover. The advertising message is conveyed to that person. In order to remove the contents of the box-like portion 16, the user must grasp either hole 22, 22' (FIG. 3 and 3A) or projection 23 (FIG. 15) provided on the one wall 20 and rupture the perforations 24 on the at least one edge 21 thereof (FIG. 12). After opening of the one wall 20, the contents are easily removable (FIG. 13). The package 10 is so designed that the only access to the contents of the package 10 is by a person opening the covering flap and exposing the person to the printed matter on the inside of the covering flap and the walls of the box-like portion 16. Additional printed matter and advertising, of course, can also be provided on the outer surfaces of the package 10. Thus, the package of the present invention may be used for catalogs, video magazines, greeting cards and other commercial ventures. The package further may be used as a mailer for individual use. For example, individuals may want to video tape family events or other personal scenes to be sent to friends, relatives or others. The package of the present invention may be used for these purposes. Further, the inner surfaces of the covering flap provides space for individuals to write personal messages to the addressee which are not visible until the package is opened.

Figure 14:
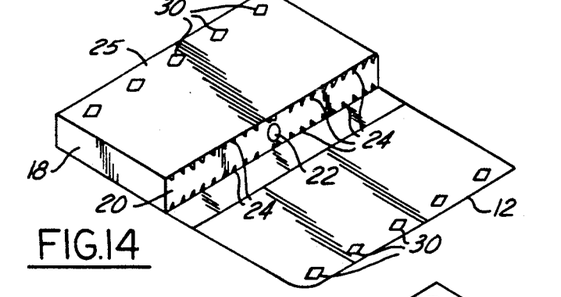
FIG. 14 is a perspective view of an alternate embodiment of the covering flap on the package.

In an alternate embodiment (FIG. 14) the covering flap wraps around the one wall 20 and the adjoining wall 25 of the box-like portion 16. A smaller sheet of material is used in a second embodiment (FIG. 14). The second end 12 of the sheet of material wraps around the one wall 20 and the adjoining wall 25 of the box-like portion 16 and the second end 12 is fastened to said adjoining wall 25.

In the event that an advertiser wants a reply from the recipient of the package containing the cassette, an appropriately printed perforated portion 31 may be provided which can be easily removed from the package and returned as an addressed mailer (FIG. 15).

The package of the present invention further permits the inclusion of a written message 35 such as a separate sheet of paper. This written message 35 may be folded such that the folds conform to at least two walls of the box-like portion 16. The written message 35 may be disposed in the package 10 prior to or subsequent to the introduction of the cassette C. Preferably, the written message 35 is placed in the package prior to introduction of the cassette C. In a unique procedure, a folded portion of the written message 35 may be inserted manually, or by automatic equipment, into the unsealed, collapsed, easily handled package 10 (FIG. 18) significantly reducing assembly costs and time. When the second end 12 is fastened to the body of the package, the written message 35 is secured therein without adhesive or other fasteners due to the tension applied to the box-like portion 16 by the covering flap. The use of the written message 35 within the closed package provides much more efficient and highly cost effective advertising. A single advertising vehicle is provided which can be assembled rapidly. The recipient has a complete print and video advertisement which includes the advertiser's complete message in a unified system which assures that the recipient is exposed to the advertising.

Furthermore, the written message 35 may have the address of the recipient imprinted thereon. A transparent window 36 is provided in the covering flap so that the address on the written message 35 is easily visible through the window 36 (FIG. 17). In this manner, a simple and inexpensive method is provided to facilitate direct mailing of the package 10. A further advantage is that the written message 35 may be individually and personally written including the name of the addressee within the message with the correct address on the same message. This procedure assures that the addressee receives the message directed to him/her. Procedures which require separate address labels are liable to errors of coordination whereby the address label is for a person not identified in the written message 35. Furthermore, separate address labels increase costs and assembly time.

Accordingly, it can be appreciated that the present invention meets the objectives. The package of the present invention provides adequate protection to the cassette or other contents of the package. The covering flap provides sufficient space on which to place an advertising message on the inner and outer surfaces thereof. The configuration of the package assures that the person opening the package cannot gain access to the contents without viewing the advertising or the message on the inner surface of the covering flap. The package permits rapid and easy access to the contents of the package. The package is fabricated from an inexpensive material by a simple folding and gluing procedure. The forming of the opened package and insertion of the cassette into the package can be automated by use of existing packaging machines. An individualized addressed written message is easily inserted into the collapsed position of the package and a window can be provided in the covering flap to expose the address on the message. The package provides a simple, inexpensive means of using video cassettes in the direct mail media and effectively combines video advertising with printed advertising. Although cassettes have been identified herein, the package of the present invention may be used for other items of all types which require an inexpensive package with protection for handling and mailing.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A package constructed of a single sheet of material for containing a cassette, said package comprising:
    a rectangular compartment portion having a first wall, a second wall foldably connected to said first wall at a first edge, a third wall foldably connected to said second wall at a second edge, a fourth wall foldably connected to said third wall at a third edge, an end strip foldably connected to said first wall at a fourth edge, and a plurality of flaps foldably connected to at least some of said first, second, third and fourth walls, said flaps being secured to each other and said end strip being secured to said fourth wall to form said rectangular compartment portion in which said first, second, third and fourth edges are parallel to each other, said first wall is parallel to said third wall, and said second wall is parallel to said fourth wall, said compartment portion having a plurality of spaced-apart perforations along at least one of said first and fourth edges, and an opening extending through said first wall, and a cover flap foldably connected to said fourth wall at a fifth edge parallel to said first, second, third and fourth edges, said cover flap having a plurality of fold lines parallel to said fifth edge, said cover flap being folded over at least said first wall and being unfoldable away from said first wall to expose said opening, said opening and said perforations being constructed and arranged for manually grasping said first wall through said opening and tearing said first wall away from said at least one of said first and fourth edges to expose and provide access to a cassette contained within said compartment portion of said package.

2. The package set forth in claim 1 further comprising means releasably securing said cover flap to one of said second, third and fourth walls.

3. The package set forth in claim 2 in which said plurality of perforations are formed in said first wall.

4. The package set forth in claim 3 in which said plurality of perforations in said first wall are disposed along both of said first and said fourth edges.

5. The package set forth in claim 4 further comprising a second plurality of perforations on said cover flap constructed and arranged such that said cover flap may be torn along said second plurality of perforations to form a card separate from said package.

6. The package set forth in claim 2 further comprising means forming a window on said cover flap for viewing a portion of said package disposed beneath said cover flap.

7. The package set forth in claim 1 in which said first wall has a first end, a second end and a central portion therebetween, and said opening is located at the central portion.

8. The package set forth in claim 1 in which said first wall has a first end, a second end, and an opening extending through said first wall at each of said first and second ends, said opening forming a projection in said first wall at each of said first and second ends.

9. A package made of a single sheet of material for containing a cassette, said package comprising a flat collapsible compartment portion having a first wall, a second wall foldably connected to said first wall at a first edge, a third wall foldably connected to said second wall at a second edge, a fourth wall foldably connected to said third wall at a third edge, an end strip foldably connected to said first wall at a fourth edge and secured to said fourth wall wherein said second and third walls lie substantially flat against said first and fourth walls and a plurality of flaps foldably connected to at least some of said first, second, third and fourth walls.

said compartment portion having a plurality of spaced-apart perforations along at least one of said first and fourth edges, and an opening extending through said first wall, and a cover flap foldably connected to said fourth wall at a fifth edge parallel to said first, second, third and fourth edges, said cover flap having a plurality of fold lines parallel to said fifth edge, said cover flap positioned to cover a least said first wall, said compartment portion and said cover flap being constructed and arranged to be folded about said first, second, third and fourth edges and said plurality of fold lines to space said first and third walls, and said second and fourth walls, respectively, wherein said first, second, third and fourth edges are parallel to each other, said first wall is parallel to said third wall, and said second wall is parallel to said fourth wall forming an open compartment portion to receive a cassette wherein said cover flap is foldable away from said first wall to expose the opening.

10. The package set forth in claim 9 further comprising means releasably securing said cover flap to one of said second, third and fourth walls.

11. The package set forth in claim 10 in which said plurality of perforations are formed in said first wall.

12. The package set forth in claim 11 in which said plurality of perforations in said first wall are disposed along both of said first and said fourth edges.

13. The package set forth in claim 12 further comprising a second plurality of perforations on said cover flap constructed and arranged such that said cover flap may be torn along said second plurality of perforations to form a card separate from said package.

14. The package set forth in claim 10 further comprising means forming a window on said cover flap for viewing a portion of said package disposed beneath said cover flap.

15. The package set forth in claim 9 in which said first wall has a first end, a second end and a central portion therebetween, and said opening is located at the central portion.

16. The package set forth in claim 9 in which said first wall has a first end, a second end, and an opening extending through said first wall at each of said first and second ends, said opening forming a projection in said first wall at each of said first and second ends.

17. A package constructed of a single sheet of material for containing a cassette, said package comprising a compartment portion having a first wall, a second wall foldably connected to said first wall at a first edge, a third wall foldably connected to said second wall at a second edge, a fourth wall foldably connected to said third wall at a third edge, a strip of material foldably connected to one of said first, second, third and fourth walls at a fourth edge, and a plurality of flaps foldably connected to at least some of said first, second, third and fourth walls.

said flaps being secured to each other and said strip of material being secured to another of said first, second, third and fourth walls to form a closed compartment portion in which said first, second, third, and fourth edges are parallel, said first wall is parallel to said third wall, and said second wall is parallel to said fourth wall, said closed compartment portion having a plurality of spaced-apart perforations along at least one of said first, second, third and fourth edges, and an opening extending through one of said first, second, third and fourth walls adjacent to said at least one of said edges, and a cover flap foldably connected to one of said first, second, third and fourth walls at a fifth edge, said cover flap having a plurality of fold lines parallel to said fifth edge, said cover flap being folded to cover the opening extending through said one of said first, second, third and fourth walls and being unfoldable away from said one of said first, second, third and fourth walls to expose the opening, the opening and the perforations being constructed and arranged for manually grasping said one of said first, second, third and fourth walls through the opening and tearing said one of said first, second, third and fourth walls along the perforations to expose and provide access to a cassette contained within said closed compartment portion of the package.

18. The package set forth in claim 17 further comprising means releasably securing said cover flap to one of said first, second, third and fourth walls.

19. The package set forth in claim 17 further comprising a second plurality of perforations on said cover flap constructed and arranged such that said cover flap may be torn along said second plurality of perforations to form a card separate from said package.

20. The package set forth in claim 17 further comprising means forming a window on said cover flap for viewing a portion of said package disposed beneath said cover flap.

21. The package set forth in claim 17 in which said first wall has a first end, a second end and a central portion therebetween, and said opening is located at the central portion.

22. The package set forth in claim 17 in which said first wall has a first end, a second end, and an opening extending through said first wall at each of said first and second ends, said opening forming a projection in said first wall at each of said first and second ends.

* * * * *